United States Patent
Ando

(10) Patent No.: US 7,173,723 B1
(45) Date of Patent: Feb. 6, 2007

(54) PRINTER AND PRINT SYSTEM CAPABLE OF PRINTING A READ IMAGE WITHOUT INTERVENTION OF HOST IN ADDITION TO PRINTING OF PRINT DATA FROM HOST

(75) Inventor: Hirofumi Ando, Nagano (JP)

(73) Assignee: Seiko Epson Corporation, Tokyo (JP)

( * ) Notice: Subject to any disclaimer, the term of this patent is extended or adjusted under 35 U.S.C. 154(b) by 510 days.

(21) Appl. No.: 09/613,426

(22) Filed: Jul. 10, 2000

(30) Foreign Application Priority Data

| Jul. 9, 1999 | (JP) | ................................. 11-196773 |
| Jul. 9, 1999 | (JP) | ................................. 11-196774 |

(51) Int. Cl.
*G06F 15/00* (2006.01)
*H04J 3/24* (2006.01)
*H04L 27/28* (2006.01)

(52) U.S. Cl. .................. 358/1.15; 358/1.14; 358/1.13; 370/395.52; 370/473

(58) Field of Classification Search ............... 358/1.15, 358/1.16, 505, 1.13, 1.14; 712/1; 370/395.52, 370/473

See application file for complete search history.

(56) References Cited

U.S. PATENT DOCUMENTS

| 5,339,176 | A | * | 8/1994 | Smilansky et al. ......... 358/504 |
| 5,943,503 | A | * | 8/1999 | Kai .............................. 708/833 |
| 6,029,238 | A | * | 2/2000 | Furukawa ........................ 712/1 |
| 6,067,169 | A | * | 5/2000 | Ohnishi ........................ 358/1.9 |
| 6,069,706 | A | * | 5/2000 | Kajita et al. ................ 358/1.15 |
| 6,084,685 | A | * | 7/2000 | Mori .......................... 358/1.14 |
| 6,177,934 | B1 | * | 1/2001 | Sugiura et al. ............. 345/748 |
| 6,400,463 | B2 | * | 6/2002 | Kitamura et al. .......... 358/1.15 |

FOREIGN PATENT DOCUMENTS

| JP | 08-340412 A | 12/1996 |
| JP | 09-238209 A | 9/1997 |
| JP | 10-124441 A | 5/1998 |
| JP | 10-164295 | 6/1998 |
| JP | 10-271263 A | 10/1998 |
| JP | 11-003154 A | 1/1999 |

OTHER PUBLICATIONS

The American Heritage Dictionary, 1994, Dell Publishing, 3rd edition, p. 821.*
The IEEE Standard Dictionary of Electrical and Electronics Terms, Apr. 1997, IEEE, Inc., Sixth Edition, pp. 146 and 744.*

* cited by examiner

*Primary Examiner*—Douglas Q. Tran
*Assistant Examiner*—Chan S. Park
(74) *Attorney, Agent, or Firm*—Sughrue Mion, PLLC

(57) ABSTRACT

A data controller having a data control function and an image read function is added to a printer. A print data prepared by a host can be normally printed and a read image can also be printed without the intervention of the host for enabling a local copy of the original image. Normally packet communications are conducted between the data controller and the printer and a response is made to a status request, etc., sent from the host to the printer in real time. To make a local copy, packet communications are not conducted and data is sent at command level from the data controller to the printer, thereby increasing the processing speed.

16 Claims, 7 Drawing Sheets

PRINTER AND PRINT SYSTEM CAPABLE OF PRINTING A READ IMAGE WITHOUT INTERVENTION OF HOST IN ADDITION TO PRINTING OF PRINT DATA FROM HOST

BACKGROUND OF THE INVENTION

1. Field of the Invention

This invention relates to a data controller for controlling transfer of data between a host computer and input/output units in a print system consisting of a host computer, a printer, a scanner, and the like and further relates to a printer and a print system that can also be used as a copier making it possible to copy an image read through a scanner, namely, make a local copy as well as print the print data from a host computer by providing such a data controller.

The present application is based on Japanese Patent Applications No. Hei. 11-196773 and 11-196774, which are incorporated herein by reference.

2. Description of the Related Art

Hitherto, in a print system comprising a printer and a scanner connected to a host computer via a network or locally, the printer has received print data prepared using application software, etc., on the host computer or print data provided by editing image data read through the scanner on the host computer, has interpreted the received print data, and has driven a print engine, thereby executing predetermined print on a print record medium.

From the host computer, data other than the print data can also be transmitted to the printer. For example, the host computer can also make an inquiry about various statuses of the printer (paper remaining amount, ink remaining amount, etc.,). The host computer can also request the printer to urgently stop print, etc.

On the other hand, in recent years, particularly the image quality of a color ink jet printer has been improved remarkably, thus if the color ink jet printer is used in combination with a scanner, a large number of users can also easily get a high-quality color copy without purchasing an expensive color copy machine.

However, to thus use the printer and the scanner, a large installation space becomes necessary and in addition, programs (drivers) for controlling the printer and the scanner must be installed in the host computer. If the same copy as an original image is simply required without editing, etc., the original image, the image data read through the scanner needs to be converted into data that can be interpreted by the printer through the host computer, thus the throughput until a color copy is obtained must be prolonged.

On the other hand, recently, to improve the responsivity of two-way communications between a host computer and a printer, a proposition to adopt IEEE (Institute of Electrical and Electronics Engineers) 1284.4 protocol, etc., for data communications therebetween and execute packet communications has also been made. Such a proposition makes it possible to assign more than one logical channel to a physical interface between the host computer and the printer, transmit print data to the printer, for example, and transmit an urgent print stop command, various status requests, etc., to the printer even before completion of transmitting the print data.

Recently, a LAN (local area network) has been constructed for often sharing one printer and one scanner, for example, by a large number of host computers. In such a case, further, to also use the printer in combination with the scanner as a copy system as described above, when one user stands in front of the scanner and reads an image through the scanner and prints a copy of the read image on the printer, another user may operate the host computer to issue a status request to the printer. Hitherto, however, an effective proposition to efficiently control transfer of data in such a case and also respond more promptly to the status request as described above has hot been made.

SUMMARY OF THE INVENTION

It is therefore an object of the invention to provide a printer or a print (and copy) system that can normally print the print data from a host computer and can also print read original image data at high speed without the intervention of the host computer and produce roughly the same copy as the original image by adding a data controller comprising a data control function and an image read function to the printer.

It is another object of the invention to make it possible to respond to a status request, etc., sent from a host computer to a printer in real time by conducting packet communications also between a data controller and the printer in the printer or print (and copy) system as mentioned above.

According to one aspect of the invention, there is provided a data controller comprising first data control means being connected to a host, a printer, and a scanner for controlling transfer of data between the host and the printer and transfer of data between the scanner and the host and second data control means for reading an original image by the scanner without the intervention of the host, converting the original image into data that can be interpreted by the printer, and transmitting the provided data to the printer, characterized in that the first data control means can transfer print data from the host to the printer for causing the printer to execute normal print and the printer can be caused to print the image data transmitted by the second data control means, thereby providing a similar copy to the original image.

Preferably, at least the first data control means transfers the data by packet communications.

The second data control means may transmit the provided data to the printer as a printer command rather than in a packet format.

According to another aspect of the invention, there is provided a data controller comprising a data flow control function being connected to a host, a printer, and a scanner for controlling transfer of data between the host and the printer and transfer of data between the scanner and the host and an image data read and conversion function for reading image data by the scanner without the intervention of the host, converting the image data into data that can be interpreted by the printer, and transmitting the provided data to the printer for printing a similar copy to an original image as a local copy, characterized by means for receiving a packet of the image data read from the scanner, transmitting the packet to the host, and transmitting packet data received from the host for controlling the scanner to the scanner, status retention means for inputting and retaining a packet indicating the status of the printer from the printer, means being responsive to an inquiry about the status of the printer from the host for receiving the packet indicating the printer status from the status retention means and transmitting the packet to the host and transmitting packet data received from the host for controlling the printer to the printer, and conversion-to-command means for converting image information input from the scanner without the intervention of the host into a command that can be interpreted by the printer.

The status retention means may input and retain the printer status from the printer periodically.

The data controller may further include data flow regulation means for asynchronously regulating data flow between the host and the printer, data flow between the scanner and the host, and data flow between the scanner and the printer.

Preferably, the data controller further includes a local copy start switch for making it possible to manually start the local copy.

The data controller may be connectable to a scanner for reading a color original image and outputting YMCK binary image data.

According to still another aspect of the invention, there is provided a printer for receiving print data from a host and printing the print data and also printing an original image input through image read means contained in the printer, the printer comprising a data reception section, an interpretation section that can interpret a command proper to the printer, and an interface unit, the interface unit comprising data flow control means for controlling transfer of data between the host and the data reception section and transfer of data between the image read means and the host and image data read and conversion means for converting image data read from the image read means without the intervention of the host into a command that can be interpreted by the interpretation section and sending the provided data to the data reception section, characterized in that the print data from the host is received at the data reception section under the control of the data flow control means and is interpreted by the interpretation section, then is expanded into image data and the image data is printed and the command provided by the image data read and conversion means is received at the data reception section and is interpreted by the interpretation section, thereby expanding into the same image data as the image data and printing the image data, whereby a copy of the original image input through the image read means can be produced.

Preferably, at least the data flow control means transfers the data by packet communications.

The image data read and conversion means may send the provided command to the data reception section intact as the command proper to the printer without converting the command into a packet format.

According to a further aspect of the invention, there is provided a data controller comprising a data flow control function being connected to a host, a printer, and a scanner for controlling transfer of data between the host and the printer and transfer of data between the scanner and the host and an image data read and conversion function for reading image data by the scanner without the intervention of the host, converting the image data into data that can be interpreted by a first interpretation section of the printer, and transmitting the provided data to the printer for printing a similar copy to an original image as a local copy, characterized by a second interpretation section comprising an interpretation capability similar to that of the first interpretation section of the printer, wherein when a similar copy to an original image is printed as the local copy, the second interpretation section interprets a command issued from the host to the printer and predetermined necessary operation is executed instead of the printer in response to the interpretation result.

If the command is determined a status request from the host as the interpretation result of the second interpretation section, the predetermined necessary operation may be to read the status from the printer and transmit the read status to the host as a packet.

According to a still further aspect of the invention, there is provided a data controller comprising a data flow control function being connected to a host, a printer, and a scanner for controlling transfer of data between the host and the printer and transfer of data between the scanner and the host and an image data read and conversion function for reading image data by the scanner without the intervention of the host, converting the image data into data that can be interpreted by a first interpretation section of the printer, and transmitting the provided data to the printer for printing a similar copy to an original image as a local copy, characterized by means for receiving a packet of the image data read from the scanner, transmitting the packet to the host, and transmitting packet data received from the host for controlling the scanner to the scanner, a second interpretation section comprising an interpretation capability similar to that of the first interpretation section of the printer, when a similar copy to an original image is printed as the local copy, the second interpretation section for interpreting a command issued from the host to the printer, status retention means for inputting and retaining a packet indicating the status of the printer if the command is determined a status request from the host as the interpretation result of the second interpretation section, means for receiving the packet indicating the printer status from the status retention means and transmitting the packet to the host and transmitting packet data received from the host for controlling the printer to the printer, and conversion-to-command means for converting image information input from the scanner without the intervention of the host into a command that can be interpreted by the first interpretation section of the printer.

Preferably, the data controller further includes data flow regulation means for monitoring packet flow between the host and the printer and packet flow between the scanner and the host and regulating the packet data flow in response to the destination of each packet.

Preferably, the data controller is connectable to a first scanner for reading a color original image and outputting YMCK binary image data and a second scanner for reading a color original image and outputting RGB full color image data.

The data controller may further include color image data conversion means for receiving the RGB full color image data from the second scanner and converting the image data into YMCK binary image data.

The data controller may further include data flow regulation means for discriminating between the YMCK binary image data received from the first scanner and the RGB full color image data received from the second scanner and regulating the image data flow so as to allow the image data intact to flow into the conversion-to-command means if the image data is the YMCK binary image data and allow the image data to flow into the conversion-to-command means through the color image data conversion means if the image data is the RGB full color image data.

Features and advantages of the invention will become understood from the following detailed description of the preferred embodiments described in conjunction with the attached drawings.

DETAILED DESCRIPTION OF THE PREFERRED EMBODIMENTS

Figure 1:
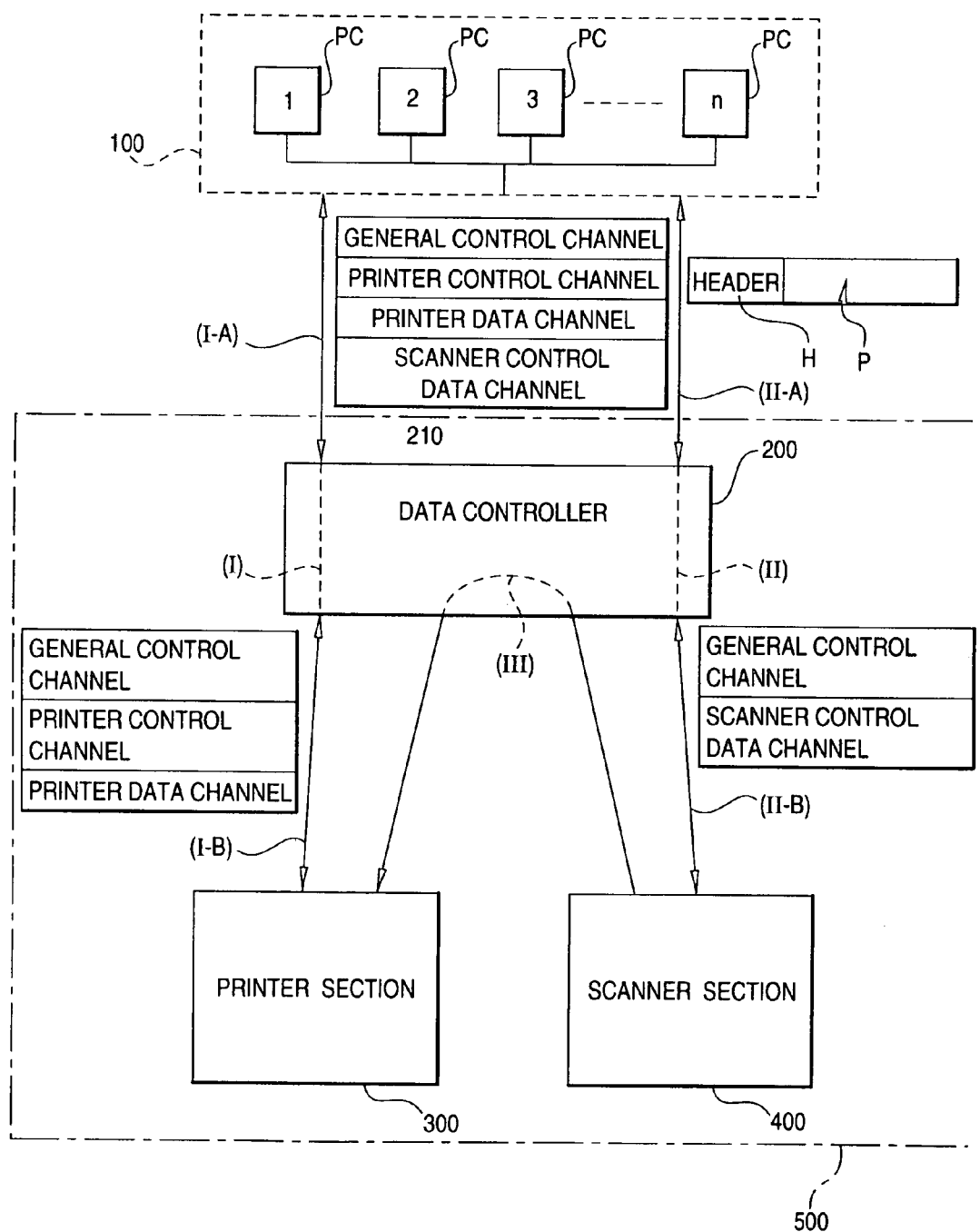
FIG. 1 is a block diagram to show the basic configuration of a system according to a first embodiment of the invention.

Referring now to the accompanying drawings, there are shown preferred embodiments of the invention. First, the basic concept of the invention will be discussed with reference to FIG. 1. FIG. 1 is a block diagram to show the general configuration of a print (and copy) system as the basic configuration of embodiments of the invention.

The print (and copy) system comprises a host computer 100, a data controller 200, a printer (section) 300, a scanner (section) 400, a cable for connecting them, and the like. The data controller 200, the printer (section) 300, and the scanner (section) 400 make up a multifunction printer 500 as one embodiment of the invention (a printer to which a data controller having a data control function and an image read function is added so that the printer can normally print the print data from a host computer and in addition, can also print read original image data at high speed without the intervention of the host computer for providing almost the same copy as the original image as one embodiment of the invention will be hereinafter referred to as multifunction printer).

The host computer 100 comprises normal personal computers (PCs) (in the example shown in the figure, n PCs 1 to n). Each PC converts graphics data, text data, or the like prepared by an application program, etc., (not shown) into the format of a command that can be interpreted by the printer 300 and transmits the conversion result to the printer 300 via the data controller 200. Each PC receives image data read using the scanner (section) 400 via the data controller 200 and edits, etc., the received image data, then transmits the data together with a print request to the printer 300 via the data controller 200.

The printer (section) 300 is a color ink jet printer and consists of a printer controller (not shown) and a print engine (not shown). The scanner (section) 400 optically scans a color image and outputs CMYK binary color image data and is formed integrally with the data controller 200. The data controller 200, which is a kind of interface unit (IFU), contains its own CPU (not shown) and controls data flow (I) between the host computer 100 and the printer (section) 300, data flow (II) between the host computer 100 and the scanner (section) 400, and data flow (III) between the printer (section) 300 and the scanner (section) 400 and also performs main control of a local copy by driving and controlling the scanner (section) 400 for reading an image and causing the printer (section) 300 to print the image.

The basic configuration of the invention involves controlling data flow on three communication control routes consisting of the route (I) between the host computer 100 and the printer (section) 300 (through the data controller 200), the route (II) between the host computer 100 and the scanner (section) 400 (through the data controller 200), and the route (III) between the printer (section) 300 and the scanner (section) 400 (through the data controller 200) in pairs (pair to pair). It also involves execution of packet communications both between the host computer 100 and the data controller 200 (I-A) and between the data controller 200 and the printer (section) 300 (I-B) on the first communication control route (I). Packet communications are also executed both between the host computer 100 and the data controller 200 (II-A) and between the data controller 200 and the scanner (section) 400 (II-B) on the second communication control route (II). On the other hand, communications at the normal command level rather than packet communications are executed between the scanner (section) 400 and the printer (section) 300 (through the data controller 200) on the third communication control route (III), as described later.

As shown in FIG. 1, communications are conducted between the host computer 100 and the data controller 200 (I-A and II-A) using four logical channels, namely, a general control channel, a printer control channel, a printer data channel, and a scanner control data channel and a packet P specifying a channel number in a header part H. Therefore, communications are conducted between the data controller 200 and the printer (section) 300 (I-B) using the three channels of the general control channel, the printer control channel, and the printer data channel and a similar packet (not shown) and between the data controller 200 and the scanner (section) 400 (II-B) using the two channels of the general control channel and the scanner control data channel and a similar packet (not shown).

Next, the functional blocks also including the host computer 100, the printer (section) 300, and the scanner (section) 400 centering on the data controller 200 will be discussed in detail with reference to FIG. 2.

First, assume that software for the printer (section) 300 (printer driver) 102 is installed in the host computer 100 (each PC). Upon reception of a printer request of graphics data prepared by the user using an application program on the PC (or data provided by putting text data into graphics using an outline font, etc.,), first a rasterizer 102a of the printer driver 102 prepares graphics data as raster data responsive to the print resolution of the printer (section) 300. Next, when a command interpreter 102b converts the raster data into a printer control language using an escape sequence as a command, a packet disassembling section 102c disassembles the command into a plurality of packets P (see FIG. 1) each consisting of a predetermined number of bits. The packets (printer control packets or printer data packets) are transmitted to the printer (section) 300 through the printer control channel or the printer data channel described above. If the status of the printer (section) 300 is returned, etc., the printer status is also disassembled into packets P (see FIG. 1) as printer control packets and transmitted to the host computer 100 through the data controller 200 (printer control channel), as described later.

On the other hand, assuming that software for the scanner (section) 400 (TWAIN driver, etc., not shown) is installed in the host computer 100 (each PC), to use the scanner (section) 400 to read an image, the user can set the resolution of the scanner (section) 400, etc., on the PC, and the setup data is also disassembled into packets P (see FIG. 1) as scanner control packets and transmitted from the host computer 100 to the data controller 200 through the scanner control data channel. In contrast, to edit the image data read using the scanner (section) 400 on the PC (for example, to paste an image to a space between text lines), the image data input from the scanner (section) 400 is disassembled into packets P (see FIG. 1) as scanner data packets and transmitted to the host computer 100 (PC) through the data controller 200 (scanner control data channel).

The data controller 200 has packet transmission-reception sections 201, 201', and 201" for receiving the packet data (status packets) from the printer (section) 300 such as the printer status, the image data read from the scanner (section) 400 and disassembled into packets, and the printer (control or data) packets transmitted from the host computer 100 and transmitting them to the host computer 100, the scanner (section) 400, and the printer (section) 300, and a status retention section 202 for inputting and retaining the status packets from the printer section 300. If an inquiry about the status of the printer section 300 is received from the host computer 100, the status packet retained by the status retention section 202 is transmitted to the host computer 100.

The packet transmission-reception section 201 receives the status packet from the status retention section 202 and transmits the received status packet tot the host computer 100 as described above. The data controller 200 also has an image data reception section 203 for inputting image data from the scanner section 400 without the intervention of the host computer 100 and a conversion-to-command section 204 for converting the image data into a command that can be interpreted by the printer section 300. The data controller 200 further includes a data flow regulation section 206 for asynchronously regulating the data flow on a data bus 205 between the host computer 100 and the printer section 300, that between the scanner section 400 and the host computer 100, and that between the scanner section 400 and the printer section 300.

Next, the operation of the print and (copy) system of the embodiment also including the host computer 100, the printer (section) 300, and the scanner (section) 400 centering on the data controller 200 will be discussed with reference to sequence charts of FIGS. 3 and 4 in addition to FIGS. 1 and 2.

First, referring again to FIG. 2, upon reception of a packet through the printer data channel, etc., on the route between the data controller 200 and the printer (section) 300 (I-B), the printer (section) 300 once stores the packet in a data reception section 301. A packet assembling/disassembling section 302 restores each packet P to a printer control language [for example, ESC (escape) sequence] in accordance with the transfer order number, error control information, etc., contained in the header H (see FIG. 1) of each packet P received in the data reception section 301 and sends the printer control language to a command interpretation section 303. The command interpretation section 303 interprets the raster command portion in the printer control language as raster data and an image expansion section 304 expands the raster data in an image buffer. On the other hand, the control code of the control command portion in the printer control language is interpreted and a print execution section 305 controls, etc., the print engine based on the control code. In the printer section 300, the packet assembling/disassembling section 302 disassembles printer information of the printer status, etc., into packets as instructed by a control section 306 (provided by the corresponding control program stored in the printer CPU and ROM), then the packets of the status, etc., are sent from the data transmission section 307 to the packet transmission-reception section 201' of the data controller 200.

Figure 2:
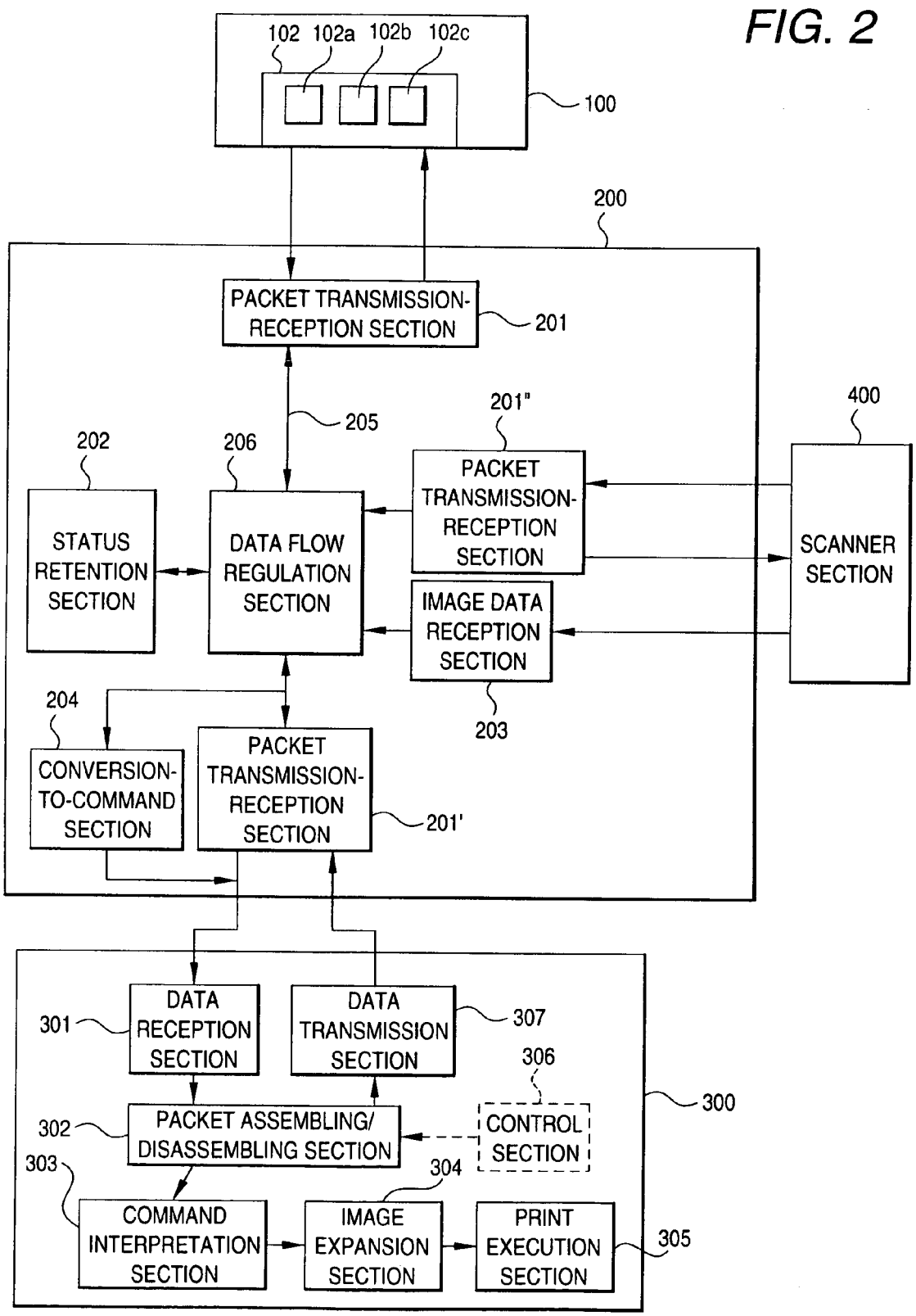
FIG. 2 is a functional block diagram to show the general configuration of the system also including a host computer, a printer (section), and a scanner (section) centering on a data controller according to the first embodiment of the invention.

The scanner (section) 400 also contains a data transmission-reception section, a packet assembling/disassembling section, an interpretation section of a control command from the host, an image read execution section, etc., although they are not shown in FIG. 2.

On the other hand, the operation for the user to read a color image through the scanner section 400 and print a copy of the image in the printer section 300 (local copy) [route (III) shown in FIG. 1] will be discussed. As described above, communications at the normal command level rather than packet communications are executed between the printer (section) 300 and the scanner (section) 400 (III). At the local copy time, often the user is at a distance from the PC and requires a copy of the original immediately (a large number of copies in some cases). Thus, if the time required for disassembling into packets and further restoring from the packets is necessary, the operation is delayed; thus communications at the normal command level rather than packet communications are executed to promote the throughput of processing from image read to print (copy). That is, at the local copy time, when the user touches a Copy button, for example, on a panel (not shown) placed on the cabinet housing the data controller 200 and the scanner section 400, a screen is displayed on the panel, requesting the user to specify the original size, the original type, resolution, etc. Then, the user sets the read original size and type, any desired resolution, etc., and reads an original. When a scan engine (not shown) operates and an image is read, the read image is converted into CMYK binary image data in the scanner section 400 and the CMYK binary image data is sent to the data controller 200. The image data is received at the image data reception section 203 in the data controller 200 and is converted by the conversion-to-command section 204 into a printer control language [ESC (escape) sequence described above] that can be understood by the printer section 300, then the printer control language is sent from the data controller 200 to the printer section 300. After this, the printer section 300 performs the same processing as that performed when printer data, etc., is received from the host computer 100 as described above. When the image read through the scanner section 400 is thus printed in the printer section 300 without the intervention of the host computer 100 (local copy), the conversion-to-command section 204 in the data controller 200 serves a similar function to that of a command generation section in the printer driver on the host.

The operation of the data controller, the printer section, the host, etc., in the embodiment will be discussed with reference to sequence charts of FIGS. 3 and 4 for the two cases of (i) case where the printer channel is initialized and print is started between the host and the printer section and (ii) case where a status request is sent from the host to the printer section at the local copy time.

(i) Printer Channel Initialization and Print Between Host and Printer Section

As described below, in the embodiment, packets communications are executed both between the host and the data controller and between the data controller and the printer, thus initialization and the print operation are started while negotiations with each other are conducted.

Figure 3:
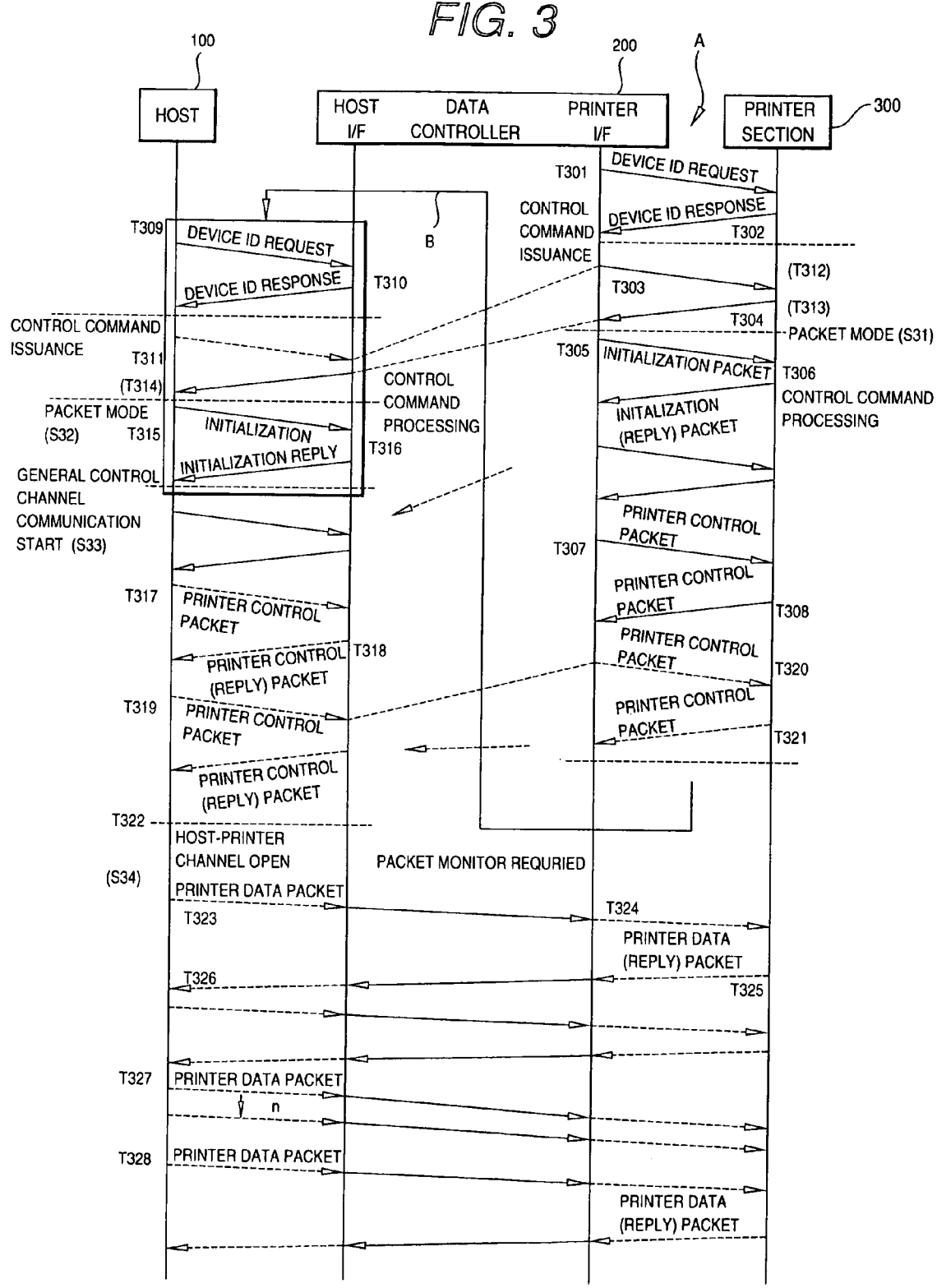
FIG. 3 is a sequence chart to describe the case where a printer channel is initialized and print is started between the host and the printer section in the system shown in FIGS. 1 and 2.

First, as shown in FIG. 3, when the printer channel is initialized, a request sent from the host 100 to the printer 300 is put on hold until completion of the initialization. That is, as shown in FIG. 3A, the data controller 200 issues a request for proper control channel access between the data controller 200 and the printer 300 to the printer 300. That is, a device ID request is made (T301) and when a response is received (T302), a control command is issued (T303) and when an open OK reply is made (T304), the data controller 200 and the printer 300 make the transition to packet mode (S31). Subsequently, channel initialization between the data controller 200 and the printer 300 is executed (T305, T306), then the channel is opened (T307, T308).

After this, as indicated by the arrow B, device ID is transferred between the host 100 and the data controller 200 in a similar manner (T309, T310), then when a control command for opening the general control channel is issued (T311), the control command is redirected intact to the printer section 300 from the data controller 200 (T312) as indicated by the dashed line in FIG. 3. In contrast, when the printer section 300 makes an open OK replay (T313), likewise the reply is sent to the host 100 (T314) and the host 100 recognizes opening of the general control channel (S32) and executes channel initialization (T315, T316), then starts general control communication (S33). Like the above-described operation, the printer control channel is opened not only between the data controller 200 and the printer 300, but also between the host 100 and the data controller 200 (T317, T318). Here, credit for asking how much data can be sent is issued from the host 100 through the data controller 200 (T319) to the printer 300 (T320) and the host 100 does not recognize how much data can be sent until reply (T321) is returned to the host 100. The printer control channel between the host 100 and the printer 300 is opened (S34) and the transition to the packet mode is made. Subsequently, the printer data channel is opened between the host 100 and the printer 300 through the data controller 200 (T323, T324, T325, T326). From this stage, it becomes necessary to monitor the packets of the transfer order number, error control information, etc., contained in the header H (see FIG. 1) of each packet P. Then, transmission of packets of the print data from the host 100 to the printer 300 is started (T327) and is executed n times, then the printer data channel is closed (T328).

In the operation, the requests and the replies flow on the data bus 205 in the data controller 200 and the data flow regulation section 206 asynchronously regulates the data flows.

(ii) Local Copy and Status Reply Flow

Figure 4:
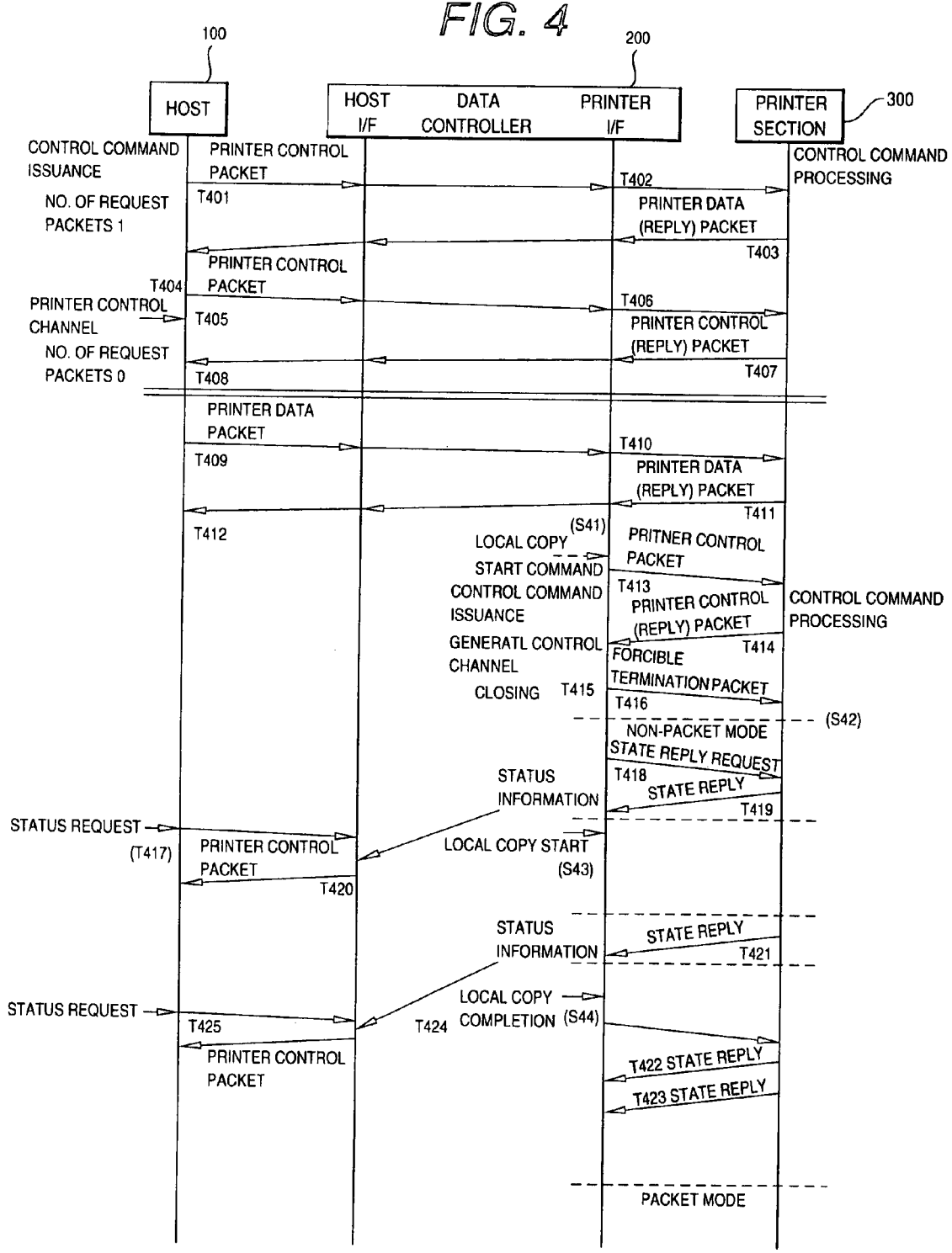
FIG. 4 is a sequence chart to describe the case where a status request is sent from the host to the printer section at the local copy time in the system shown in FIGS. 1 and 2.

First, as shown in FIG. 4, the printer control channel is used to transfer the number of request packets 1 (T401, T402, T403, T404) and the number of request packets 0 (T405, T406, T407, T408). If transmission data does not exist, the printer data channel is closed (T409, T410, T411, T412).

In this state, if the user presses the Copy button, for example, on the panel (not shown) placed on the cabinet housing the data controller 200 and the scanner section 400 as described above, a local copy start command is given (S41). That is, a printer control command output from the packet mode is issued from the data controller 200 to the printer 300 (T413) and when a response is made (T414), the general control channel is closed (T415). A command for forcibly terminating the four logical channels is output (T416) and the data controller 200 to the printer 300 makes the transition to a non-packet mode (S42). Here, for example, if a printer status request of the ink remaining amount, etc., is received from the host 100 (T417), a state reply request is issued to the printer 300 (T418). When the reply is made (T419), status information is transmitted to the host 100 (T420). After this, a local copy is started (S43) and data is transmitted at the command level from the scanner 400 through the data controller 200 to the printer 300 as described above until completion of the local copy (S44); meanwhile, a printer status request of the ink remaining amount, etc., may be issued from the host 100. In the embodiment, a status request occurring during the local copy is gotten and retained by the data controller 200 periodically during the copying and a response to the status request is made from the data controller 200 to the host 100. That is, the printer 300 is controlled so as to make a state reply (T421, T422, T423) and the state reply is retained each time by the status retention section 202 and when a status request is issued from the host 100, the state retained just before is returned to the host 100 (T421, T424, T425).

In the operation, the requests and the replies flow on the data bus 205 in the data controller 200 and the data flow regulation section 206 asynchronously regulates the data flows. For example, even if the user presses the Copy button on the panel, no response is made to the Copy button input if the printer data channel is opened at the time. If the timing of issuing the printer control packet (T413) and reception of a host command contend, a reply to the host command takes precedence. Other commands flowing into the control channel from the host 100 during the local copy are not made to flow into the printer 300 and a reply to each command is made from the data controller 200 to the host 100.

As described above, the data controller of the embodiment carries out two-way packet communications not only with the host, but also with the printer, so that reply data can be returned to the host without impairing the real-time property. Normal communications rather than packet communications are executed in a local copy, namely, between the scanner and the printer, so that the processing speed is not slowed down.

Further, when the host makes an inquiry about the printer status during the local copy, the data controller returns the status retained periodically by the data controller to the host, thus the printer status [for example, ink out (ink shortage) state, etc.,] can be grasped and sent to the host in the form closer to the real time than was previously possible.

Figure 5:
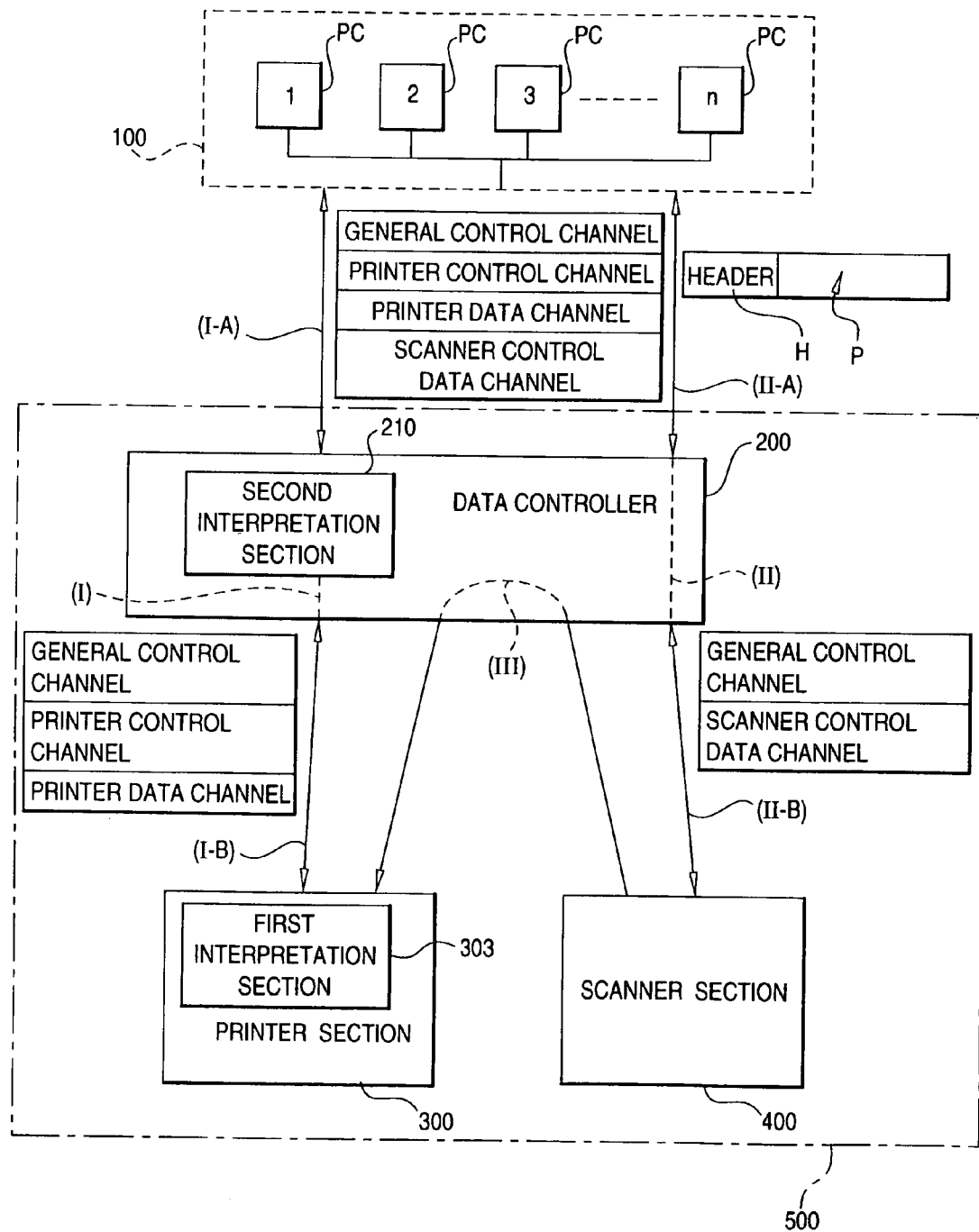
FIG. 5 is a block diagram to show the basic configuration of a system according to a second embodiment of the invention.

Next, a second embodiment of the invention will be discussed with reference to the accompanying drawings. FIG. 5 is a block diagram to show the general configuration of a print (and copy) system according to the second embodiment of the invention.

The configuration of the print (and copy) system according to the second embodiment shown in FIG. 5 is similar to that of the first embodiment shown in FIG. 1. Parts similar to those previously described with reference to FIG. 1 are denoted by the same reference numerals in FIG. 5 and will not be discussed again.

In the second embodiment, a printer (section) 300 comprises a first (printer) interpretation section that can interpret a proper printer control language as described later, and interprets a command from a host, etc., by the interpretation section and performs the necessary operation responsive to the command.

A scanner (section) 400 optically scans a color image and outputs RGB full color image data or CMYK binary color image data and is formed integrally with a data controller 200.

The system of the embodiment is characterized by the fact that the data controller 200 contains a second interpretation section that can interpret the printer control language described above like the first (printer) interpretation section aside therefrom and that while a local copy is made between the scanner (section) 400 and the printer (section) 300 via a third communication route (III), the second interpretation section in the data controller 200 interprets a command from the host computer 100 instead of the printer and a CPU in the data controller 200 performs control for the necessary operation in response to the command interpretation result, as shown in FIG. 5.

Figure 6:
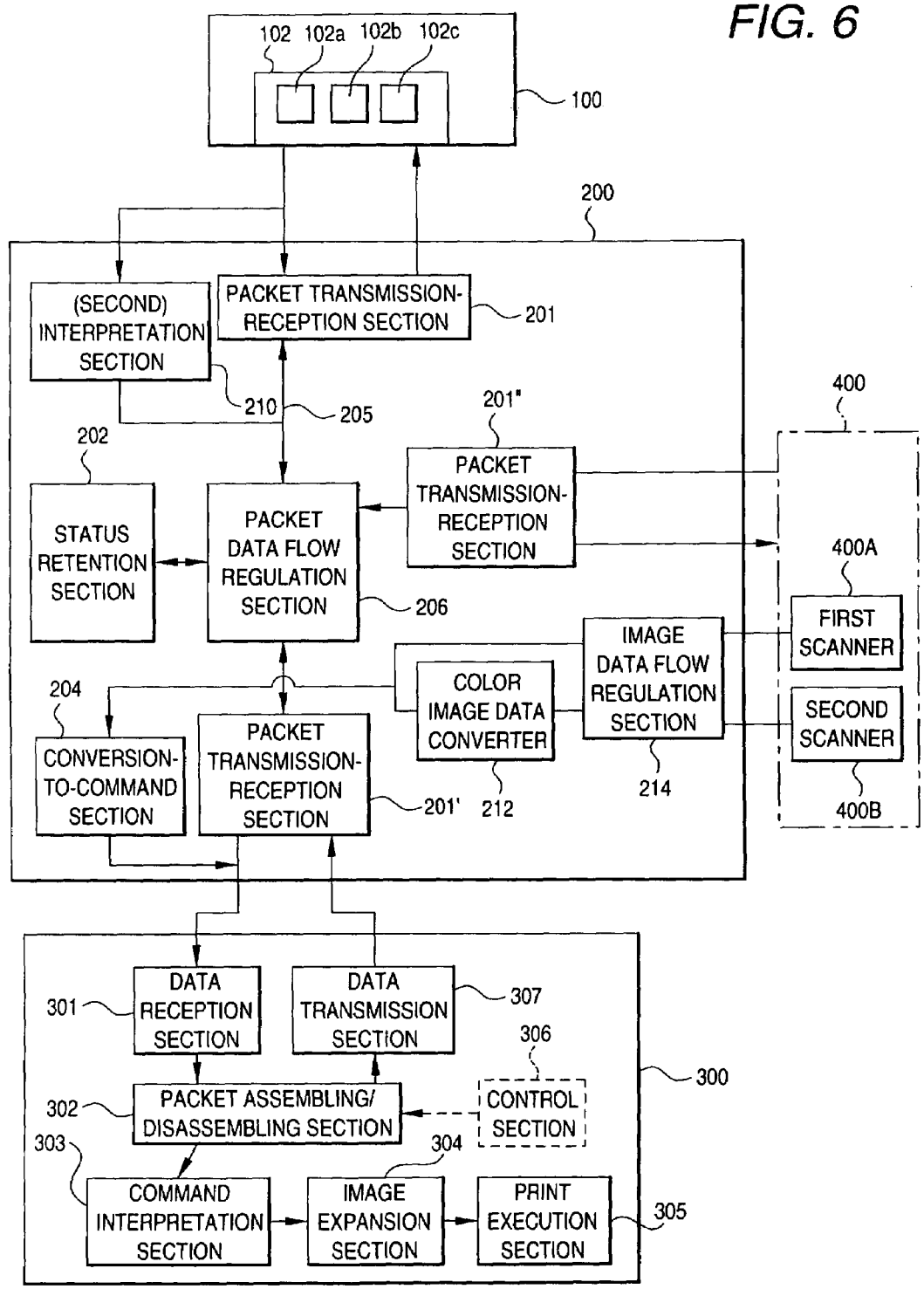
FIG. 6 is a functional block diagram to show the general configuration of the system also including a host computer, a printer (section), and a scanner (section) centering on a data controller according to the second embodiment of the invention.

As shown in FIG. 6, like the data controller of the first embodiment shown in FIG. 2, the data controller 200 of the second embodiment has packet transmission-reception sections 201, 201', and 201" for receiving the packet data (status packets) from the printer (section) 300 such as the printer status, the image data read from the scanner (section) 400 and disassembled into packets, and the printer (control or data) packets transmitted from the host computer 100 and transmitting them to the host computer 100, the scanner (section) 400, and the printer (section) 300, and a status retention section 202 for inputting and retaining the status packets from the printer section 300. In addition, the data controller 200 of the embodiment further includes an interpretation section 210. The interpretation section 210 interprets a command sent from the host computer 100 to the printer section 300 during the above-described local copy and if the command is interpreted as an inquiry about the printer status, the status retention section 202 inputs the corresponding status packet from the printer section 300 and transmits the status packet to the host computer 100 through the packet transmission-reception section 201.

The data controller 200 also has a conversion-to-command section 204 for converting image data input from the scanner section 400 without the intervention of the host computer 100 into a command that can be interpreted by the printer section 300. The data controller 200 further includes a data flow regulation section 206 for monitoring the data flow on a data bus 205 between the host computer 100 and the printer section 300 and that between the scanner section 400 and the host computer 100 and regulating the packet data flow in response to the destination of each packet.

The system of the embodiment is characterized by the fact that the scanner section 400 is made up of a first scanner 400A for reading a color original image and outputting YMCK binary image data and a second scanner 400B for reading a color original image and outputting RGB full color image data.

Thus, the data controller 200 further includes a color image data converter 212 for receiving the RGB full color image data from the second scanner 400B and converting the image data into YMCK binary image data, and the color image data converter 212 is implemented as an ASIC (application-specific integrated circuit).

The data controller 200 further includes an image data flow regulation section 214 for discriminating between the YMCK binary image data received from the first scanner 400A and the RGB full color image data received from the second scanner 400B and regulating the image data flow so as to allow the image data intact to flow into the conversion-to-command section 204 if the image data is YMCK binary image data and allow the image data to flow into the conversion-to-command section 204 through the color image data converter 212 if the image data is RGB full color image data.

Here, the operation of the print and (copy) system of the embodiment also including the host computer 100, the printer (section) 300, and the scanner (section) 400 (first scanner 400A and second scanner 400B) centering on the data controller 200 will be discussed with reference to a sequence chart of FIG. 7 in addition to FIGS. 5 and 6.

First, referring to FIG. 6, upon reception of a packet through a printer data channel, etc., on the route between the data controller 200 and the printer (section) 300 (I-B), the printer (section) 300 once stores the packet in a data reception section 301. A packet assembling/disassembling section 302 restores each packet P to a printer control language [for example, ESC (escape) sequence] in accordance with the transfer order number, error control information, etc., contained in the header H (see FIG. 5) of each packet P received in the data reception section 301 and sends the printer control language to a command interpretation section 303. The command interpretation section 303 interprets the raster command portion in the printer control language as raster data and an image expansion section 304 expands the raster data in an image buffer. On the other hand, the control code of the control command portion in the printer control language is interpreted and a print execution section 305 controls, etc., the print engine based on the control code. In the printer section 300, the packet assembling/disassembling section 302 disassembles printer information of the printer status, etc., into packets as instructed by a control section 306 (provided by the corresponding control program stored in the printer CPU and ROM), then the packets of the status, etc., are sent from the data transmission section 307 to the packet transmission-reception section 201' of the data controller 200.

The first scanner 400A and the second scanner 400B also contain a data transmission-reception section, a packet assembling/disassembling section, an interpretation section of a control command from the host, an image read execution section, etc., although they are not shown in FIG. 6.

On the other hand, the operation for the user to read a color image through the first scanner 400A or the second scanner 400B and print a copy of the image in the printer section 300 (local copy) [route (III) shown in FIG. 5] is similar to that in the first embodiment. In the second embodiment, at the local copy time, when the user touches a Copy button, for example, on a panel (not shown) placed on the cabinet housing the data controller 200 and the first scanner 400A or the second scanner 400B, a screen is displayed on the panel, requesting the user to specify the original size, the original type, resolution, etc. Then, the user sets the read original size and type, any desired resolution, etc., and reads an original. When a scan engine (not shown) operates and an image is read, the read image is converted into CMYK binary image data if the first scanner 400A is applied, and the CMYK binary image data is sent to the data controller 200. On the other hand, if the second scanner 400B is applied, the read image is converted into RGB full color image data and the RGB full color image data is sent to the data controller 200. The image data flow regulation section 214 of the data controller 200 discriminates between the YMCK binary image data and the RGB full color image data and allows the image data intact to flow into the conversion-to-command section 204 if the image data is YMCK binary image data and allows the image data to flow into the conversion-to-command section 204 through the color image data converter 212 if the image data is RGB full color image data. That is, the RGB full color image data is sent to the color image data converter 212, which then converts the image data into YMCK binary image data. The color image data converter 212 performs, as a hardware circuit (ASIC), similar conversion processing performed by a printer driver. The provided YMCK binary image data is output from the color image data converter 212 and is sent to the conversion-to-command section 204. The purpose of performing the conversion processing by the ASIC rather than software is to speed up the conversion processing for shortening the throughput of a local copy using the second scanner 400B.

The image data is converted by the conversion-to-command section 204 in the data controller 200 into a printer control language [ESC (escape) sequence described above] that can be understood by the printer section 300, then the printer control language is sent from the data controller 200 to the printer section 300. After this, the printer section 300 performs the same processing as that performed when printer data, etc., is received from the host computer 100 as described above. When the image read through the first scanner 400A or the second scanner 400B is thus printed in the printer section 300 without the intervention of the host computer 100 (local copy), the conversion-to-command section 204 in the data controller 200 serves a similar function to that of a command generation section in the printer driver on the host.

The operation of the data controller, the printer section, the host, etc., in the embodiment will be discussed with reference to a sequence chart of FIG. 7 for the case where a status request is sent from the host to the printer section at the local copy time.

As described below, also in the embodiment, packets communications are executed both between the host and the data controller and between the data controller and the printer, thus initialization and the print operation are started while negotiations with each other are conducted.

Figure 7:
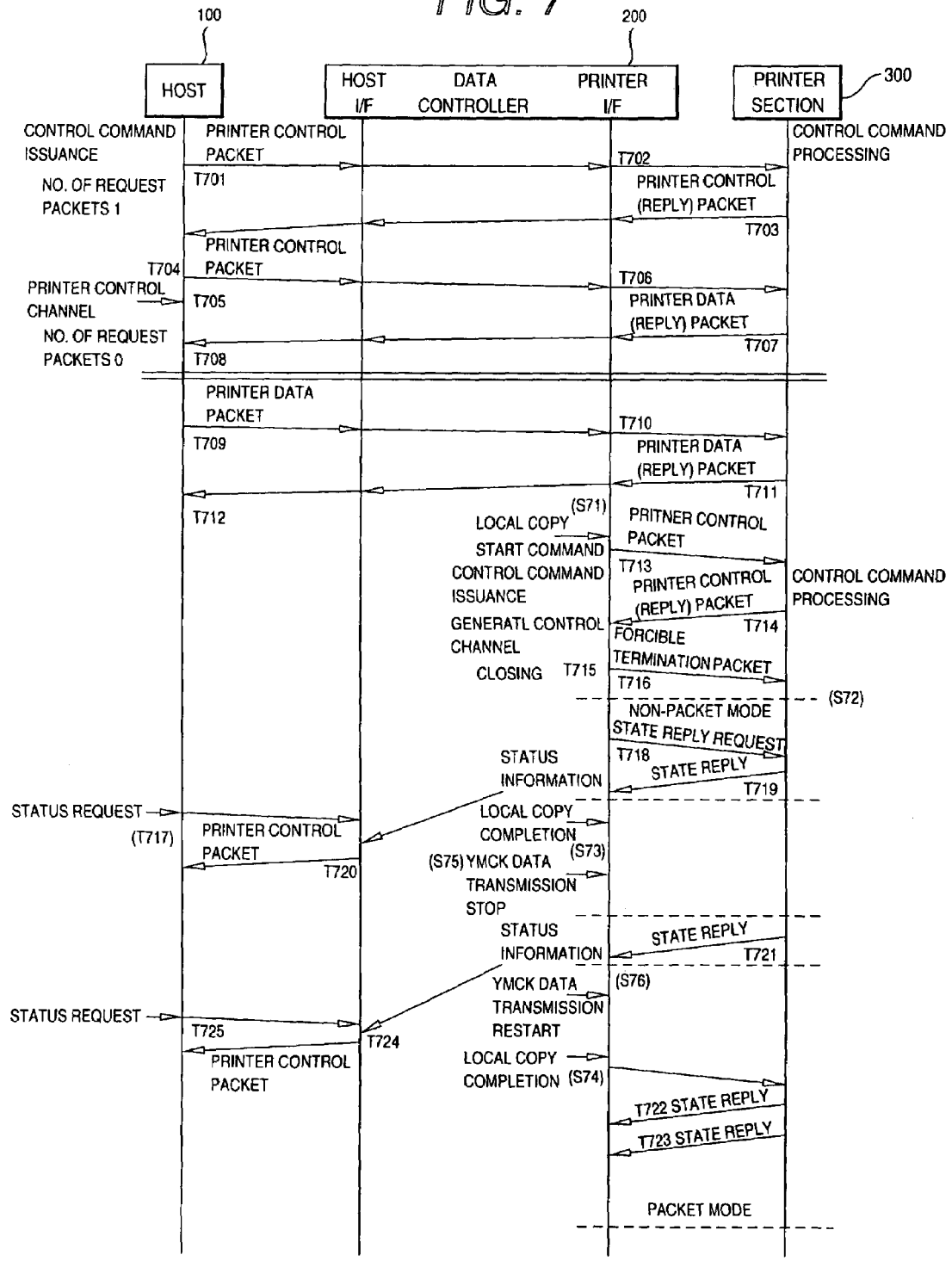
FIG. 7 is a sequence chart to describe the case where a status request is sent from the host to the printer section at the local copy time in the system shown in FIGS. 5 and 6.

First, as shown in FIG. 7, the printer control channel is used to transfer the number of request packets 1 (T701, T702, T703, T704) and the number of request packets 0 (T705, T706, T707, T708). If transmission data does not exist, the printer data channel is closed (T709, T710, T711, T712).

In this state, if the user presses the Copy button, for example, on the panel (not shown) placed on the cabinet housing the data controller 200 and the first scanner 400A, the second scanner 400B as described above, a local copy start command is given (S71). That is, a printer control command output from the packet mode is issued from the data controller 200 to the printer 300 (T713) and when a response is made (T714), the general control channel is closed (T715). A command for forcibly terminating the four logical channels is output (T716) and the data controller 200 to the printer 300 makes the transition to a non-packet mode (S72). Here, for example, if a printer status request of the ink remaining amount, etc., is received from the host 100, it is interpreted by the interpretation section 210 in the data controller 200 and a state reply request is issued to the printer 300 (T718). When the reply is made (T719), status information is transmitted to the host 100 (T720).

After this, a local copy is started (S73) and data is transmitted at the command level from the scanner 700 through the data controller 200 to the printer 300 as described above until completion of the local copy (S74); meanwhile, a printer status request of the ink remaining amount, etc., may be issued from the host 100. In the embodiment, if a status request occurs during the local copy, the interpretation section 210 interprets the status request and printer status read control is performed as described above. That is, the printer 300 is controlled so as to make a state reply (T721, T722, T723) and the state reply is retained by the status retention section 202, then the state is returned to the host 100 (T721, T724, T725).

As described above, to use the second scanner 400B for the local copy, RGB full color image data is sent to the color image data converter 212, which then converts the image data into YMCK binary image data and outputs the YMCK binary image data. Therefore, when the printer 300 issues a state reply, transmitting the YMCK binary image data from the color image data converter 212 is stopped (S75) and upon completion of the state reply, transmitting the YMCK binary image data from the color image data converter 212 is restarted (S76).

In the operation, even if the user presses the Copy button on the panel, no response is made to the Copy button input if the printer data channel is opened at the time. If the timing of issuing the printer control packet (T713) and reception of a host command contend, a reply to the host command takes precedence. Other commands flowing into the control channel from the host 100 during the local copy are not made to flow into the printer 300 and a reply to each command is made from the data controller 200 to the host 100.

As described above, the data controller of the embodiment has the second interpretation section aside from the (first) interpretation section of the printer and the second interpretation section interprets a status request, etc., sent from the host to the printer during the local copy, so that printer status read or input, transmission of the printer status packet to the host, and the like can be executed in real time even during the local copy.

As many apparently widely different embodiments of the invention may be made without departing from the spirit and scope thereof, it is to be understood that the invention is not limited to the specific embodiments thereof except as defined in the appended claims. For example, in the description of the first and second embodiments, the scanner section 400 and the data controller 200 are formed in one piece, but they may be formed integrally with the printer section 300; in contrast, the data controller 200, the printer section 300, and the scanner section 400 may be provided as separate components. The invention can be applied not only to ink jet printers, but also to other types of printers, needless to say.

What is claimed is:

1. A data controller comprising:
   first data control means, including packet transmission-reception means, which is connected to a host, a printer, and a scanner, wherien the first data control means is for transmitting and receiveing packets to and from the host, printer, and scanner so that a pluraltiy of logical channels are established at least between the host and the printer, wherien the first data control means is further for controlling transfer of data between the host and the printer and transfer of data between the scanner and the host; and
   second data control means, including an image data reception section for receiving an original image read by the scanner without an intervention of the host and the packet transmission-reception means, and a conversion-to-command section for converting the original image into data that can be interpreted by the printer and transmitting the converted data to the printer without intervention of the packet transmission-reception means,
   wherein said first data control means can transfer print data from the host to the printer through the packet transmission-reception means for causing the printer to execute normal print, and the printer can be caused to print the converted data transmitted by the conversion-to-command section without an intervention of the packet transmission-reception means, thereby providing a similar copy to the original image, the plurality of logical channels allowing for the data controller to respond to a plurality of requests simultaneously.

2. A data controller to be connected to a host, a printer, and a scanner, said data controller having (i) a data flow control function for controlling transfer of data between the host and the printer and transfer of data between the scanner and the host using a plurality of logical channels, and (ii) an image data read and conversion function for reading image data by the scanner without an intervention of the host, converting the image data into data that can be interpreted by the printer, and transmitting the converted data to the printer using normal communication for printing a similar copy to an original image as a local copy, the plurality of logical channels and the normal communication allowing for the data controller to respond to a plurality of requests simultaneously, and obtaining a status during a copying process, said data controller comprising:

means for receiving a packet of the image data read from the scanner, transmitting the packet to the host, and transmitting packet data received from the host for controlling the scanner to the scanner;

status retention means for inputting and retaining a packet indicating the status of the printer from the printer;

means being responsive to an inquiry about the status of the printer from the host for receiving the packet indicating the status from said status retention means and transmitting the packet to the host and transmitting packet data received from the host for controlling the printer to the printer; and conversion-to-command means for converting image information input from the scanner without the intervention of the host into a command that can be interpreted by the printer.

3. A data controller according to claim 2, wherein said status retention means inputs and retains the printer status from the printer periodically.

4. A data controller according to claim 2, further comprising data flow regulation means for asynchronously regulating data flow between the host and the printer, data flow between the scanner and the host, and data flow between the scanner and the printer.

5. A data controller according to claim 2, further comprising a local copy start switch for making it possible to manually start a local copy.

6. A data controller according to claim 2, wherein said data controller is connectable to a scanner for reading a color original image and outputting YMCK binary image data.

7. A printer for receiving print data from a host and printing the print data and also printing an original image input through image read means contained in said printer, said printer comprising:

a data reception section;

an interpretation section that can interpret a command proper to said printer; and an interface unit comprising: (i) packet transmission-reception means connected to the host, the data transmission-reception section, and the scanner, for transmitting and receiving packets to and from the host, the data transmission-reception section, and the scanner, so that a plurality of logical channels can eb established at least between the host and the data reception section, (ii) data flow control means for controlling transfer of data between the host and said data reception section and transfer of data between the image read means and the host using a plurality of logical channels, (iii) an image data reception section for receiving image data read by the in age read means without an intervention of the host and the packet transmission-reception means, and (iv) image data conversion means for converting the image data received by the image data reception section into a command that can be interpreted by said interpretation section and sending the converted command to said data reception section, the plurality of logical channels and the normal communication allowing for the printer to respond to a plurality of requests simultaneously, wherein the print data from the host is received at said data reception section through the packet transmission-reception means under a control of the data flow control means and is interpreted by said interpretation section, then is expanded into image data and the image data is printed, and wherein the command converted by the image data conversion means is received at said data reception section without an intervention of the packet transmission-reception means and is interpreted by said interpretation section, thereby expanding into the same image data as the image data and printing the image data, whereby a copy of the original image input through the image read means can be produced.

8. A print system comprising:

packet transmission-reception means, connected to a host computer, a printer, and a scanner, for transmitting and receiving packets to and from the host computer, the printer, and the scanner, so that a plurality of logical channels can be established between the host computer and the printer and between the host computer and the scanners;

a data reception section for receiving data obtained by the scanner without intervention of the host computer and the packet transmission-reception means; and a conversion-to-command section for converting the data received by the data reception section into data that can be interpreted by the printer and transmitting the converted data to the printer without an intervention of the packet transmission-reception means, wherein the plurality of logical channels allow for the print system to respond to a plurality of requests simultaneously.

9. A data controller to be connected to a host, a printer, and a scanner, said data controller having (i) a data flow control function for controlling transfer of data between the host and the printer and transfer of data between the scanner and the host using a plurality of logical channels, and (ii) an image data read and conversion function for reading image data by the scanner without an intervention of the host, converting the image data into data that can be interpreted by a first interpretation section of the printer, and transmitting the converted data to the printer for printing a similar copy to an original image as a local copy, wherein the data controller responds to a plurality of requests simultaneously and obtains a status during a copying process;

said data controller comprising:

a second interpretation section having an interpretation capability similar to that of the first interpretation section of the printer, wherein, when the similar copy to the original image is printed as the local copy, said second interpretation section interprets a command issued from the host to the printer, and predetermined necessary operation is executed instead of the printer in response to an interpretation result from the second interpretation section.

10. A data controller according to claim 9, wherein at least the data transfer between the host and the printer and the data transfer between the scanner and the host are executed by packet communications.

11. A data controller according to claim 9, wherein if the command is determined a status request from the host as the interpretation result of said second interpretation section, the predetermined necessary operation is to read the status from the printer and transmit the read status to the host as a packet.

12. A data controller to be connected to a host, a printer, and a scanner, said data controller having (i) a data flow control function for controlling transfer of data between the host and the printer and transfer of data between the scanner and the host using a plurality of logical channels, and (ii) an image data read and conversion function for reading image data by the scanner without an intervention of the host, converting the image data into data that can be interpreted by a first interpretation section of the printer, and transmitting the converted data to the printer for printing a similar copy to an original image as a local copy using normal communication, the plurality of logical channels and the normal communication allowing for the data controller to respond to a plurality of requests simultaneously, and obtaining a status during a copying process, said data controller comprising:

means for receiving a packet of the image data read from the scanner, transmitting packet data received from the host for controlling the scanner to the scanner, a second interpretation section having an interpretation capability similar to that of the first interpretation section of the printer, when the similar copy to the original image is printed as the local copy, said second interpretation section for interpreting a command issued from the host to the printer;

status retention means for inputting and retaining a packet indicating the status of the printer if the command is determined a status request from the host as an interpretation result of said second interpretation section;

means for receiving the packet indicating the status from said status retention means and transmitting the packet to the host and transmitting packet data received from the host for controlling the printer to the printer; and conversion-to-command means for converting image information input from the scanner without the intervention of the host into a command that can be interpreted by the first interpretation section of the printer.

13. A data controller according to claim 12, further comprising data flow regulation means for monitoring packet flow between the host and the printer and packet flow between the scanner and the host and regulating the packet data flow in response to a destination of each packet.

14. A data controller according to claim 12, wherein said data controller is connectable to a first scanner for reading a color original image and outputting YMCK binary image data and a second scanner for reading a color original image and outputting RGB full color image data.

15. A data controller according to claim 14, further comprising color image data conversion means for receiving the RGB full color image data from the second scanner and converting the image data into the YMCK binary image data.

16. A data controller according to claim 15, further comprising data flow regulation means for discriminating between the YMCK binary image data received from the first scanner and the RGB full color image data received from the second scanner, and regulating the image data flow so as to allow the image data intact to flow into said conversion to-command means if the image data is the YMCK binary image data and allow the image data to flow into said conversion-to-command means through said color image data conversion means if the image data is the RGB full color image data.

\* \* \* \* \*